United States Patent
Devreese (10) Patent No.: US 11,441,653 B1
(45) Date of Patent: Sep. 13, 2022

(54) INTEGRATED GEARBOX IN ELECTRIC MOTOR SYSTEMS

(71) Applicant: Dana Automotive Systems Group, LLC, Maumee, OH (US)

(72) Inventor: Thibault Devreese, Ghent (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/326,144

(22) Filed: May 20, 2021

(51) Int. Cl.
| | |
|---|---|
| F16H 37/08 | (2006.01) |
| B60K 17/16 | (2006.01) |
| B60L 15/20 | (2006.01) |
| F16H 3/66 | (2006.01) |
| F16H 48/10 | (2012.01) |
| F16H 57/04 | (2010.01) |
| B60K 17/12 | (2006.01) |
| B60K 1/00 | (2006.01) |

(52) U.S. Cl.
CPC ........... *F16H 37/082* (2013.01); *B60K 17/12* (2013.01); *B60K 17/16* (2013.01); *B60L 15/2054* (2013.01); *F16H 3/663* (2013.01); *F16H 48/10* (2013.01); *F16H 57/0413* (2013.01); *B60K 2001/001* (2013.01); *F16H 57/0434* (2013.01); *F16H 2048/106* (2013.01); *F16H 2200/2007* (2013.01)

(58) Field of Classification Search
CPC ...... F16H 37/082; F16H 48/10; B60K 17/165
See application file for complete search history.

(56) References Cited

U.S. PATENT DOCUMENTS

| | | | |
|---|---|---|---|
| 5,445,234 A | 8/1995 | Hall, III | |
| 10,211,702 B2 | 2/2019 | Jahshan | |
| 10,696,149 B2 | 6/2020 | Pearce, Jr. et al. | |
| 10,703,201 B2* | 7/2020 | Bassis | B60K 7/0007 |
| 11,035,451 B1* | 6/2021 | Ahn | B60W 30/18009 |
| 11,131,371 B2* | 9/2021 | Kang | B60K 17/165 |
| 2012/0129644 A1* | 5/2012 | Palfai | B60K 1/00 |
| | | | 475/150 |
| 2013/0123058 A1* | 5/2013 | Markl | B60K 7/0007 |
| | | | 475/150 |
| 2019/0078673 A1* | 3/2019 | Uchida | F16H 7/06 |
| 2020/0331343 A1* | 10/2020 | Takahashi | H02K 9/19 |
| 2021/0033179 A1* | 2/2021 | Brammer | B60K 1/00 |

OTHER PUBLICATIONS

Janssen, P. et al., "Highly Integrated Electric Drive Unit for Passenger Cars," ATZ Worldwide, vol. 120, Oct. 20, 2018, 4 pages.

* cited by examiner

*Primary Examiner* — Derek D Knight
(74) *Attorney, Agent, or Firm* — McCoy Russell LLP (57) ABSTRACT

Methods and systems are provided for integrating a gearbox into an electric motor. In one example, a system may include enclosing a gearbox containing a planetary gear set and a differential within an envelope of a rotor of the electric motor.

18 Claims, 4 Drawing Sheets

INTEGRATED GEARBOX IN ELECTRIC MOTOR SYSTEMS

TECHNICAL FIELD

The present description relates generally to systems for integrating a gearbox into a rotor of an electric motor for a vehicle.

BACKGROUND AND SUMMARY

In electric vehicles, the powertrain architecture may include a high voltage battery, an electric motor with power controller electronics, and a transmission, which may include a gearbox. Voltage from the battery may be supplied to the electric motor in order for the electric motor to generate power to drive the electric vehicle, which may then be transmitted to the drive wheels via the gearbox.

The electric motor may include a stator and a rotor, with the rotor coupled to one or more output shafts. The stator may be stationary, and may be electrically powered by a voltage source (such as a battery) to generate currents in a plurality of conducting wires included within the stator, which may then generate magnetic fields. In one example, the magnetic fields generated by the stator may induce a current within the rotor, causing the rotor to rotate in response to the combined magnetic fields of the stator and rotor. In another example, the rotor may contain permanent magnets, which may cause the rotor to rotate in response to the magnetic fields generated by the stator. The rotational motion of the rotor may then translate into a rotation of one or more output shafts coupled to the rotor of the electric motor.

The gearbox may allow for transfer of power from the motor to the drive wheels, and may include a planetary gear set for transmitting power from the electric motor, a differential, and a clutch. The planetary gear set may receive input from the electric motor via coupling to an output shaft or output shafts of the electric motor, and transmit the power of the electric motor to the drive wheels of the electric vehicle by adapting the RPM of the electric motor into a suitable RPM of the wheels via a set of meshing gears. The gears of the planetary gear set may rotate at different fractions (corresponding to gear ratios of the meshing gears) of the RPM of the electric motor, which may then correspond to an output RPM of the drive wheels of the vehicle. The differential may then distribute the power supplied by the planetary gear set between the two drive wheels. For example, in an open differential, torque may be distributed evenly between the two wheels comprising the drive wheels. A clutch may couple or decouple power transmission from the electric motor to one or more output shafts, and may be utilized during a gear change.

The planetary gear set may typically include a set of gears including one or more central sun gears meshing with one or more planet gears. The planet gears may be mechanically coupled to a carrier, which may serve to cause the planet gears to rotate together about a central axis. The planet gears may also mesh with a ring gear, which may enclose all of the planet gears. Power input from the electric motor to the planetary gear set may come from any of the carrier, ring gear or one or more sun gears.

Typically, the gearbox, power electronics, and electric motor may be distinct components coupled together. Attempts have been made to integrate such components of an electric vehicle system in order to reduce excess bulk and weight, the reduction being desirable in order to increase vehicle efficiency, in addition to reducing cost. One example approach for an integrated drive unit in an electric vehicle is given by Pearce, Jr. et al. in U.S. Patent Application No. 2020/10696149. Therein, Pearce, Jr. et al. introduce an integrated drive unit assembly including a gearbox, a power inverter, and an electric motor, wherein the gearbox, the electric motor, and the power inverter are assembled into a single unit with a multi-piece housing. The electric vehicle may also include a mutual thermal management system coupled to the integrated drive unit assembly and having at least one liquid coolant loop that is thermally coupled to the electric motor, the power inverter, the gearbox, a cooling system, a refrigeration system, and an HVAC system.

However, the inventors herein have recognized potential issues with such systems. As one example, in the integrated system shown by Pearce, Jr. et al., multiple distinct components are present, thereby adding components and costs. As outlined by Pearce, Jr. et al., the gearbox, electric motor, and power inverter may all have different thermal characteristics and different operating temperatures, which may increase the complexity of the cooling system. In particular, while the gearbox may operate up to temperatures as high as 100° C., the electronics of the inverter are kept at much lower temperatures, e.g. such as 40° C. to 50° C., thereby demanding thermal isolation of the gearbox and the inverter.

In one example, the issues described above may be addressed by a system for an electric motor system, comprising one or more of a planetary gear set and a differential integrated within an envelope of a rotor of the electric motor. In this way, by integrating the gearbox into the interior of the rotor, and simplifying liquid coolant system operation, a cost effective and compact vehicle propulsion system may be designed.

As an example, a compound planetary gear set for power transmission and a planetary differential gear set may be included within an interior of a rotor of an electric motor. In a conventional electric motor, the interior of the rotor is a non-functional space. In one example, a first sun gear of the compound planetary gear set may be anchored to the housing of the electric motor, while the planet gears meshing with the aforementioned sun gear may be anchored to the rotor, allowing for relative motion of the sun gear and the planetary gears, and transmission of power via the planetary differential system. The differential may be a planetary gear set, receiving input on a ring gear from a second sun gear of the compound planetary gear set meshing with planet gears of the compound planetary gear set anchored to the rotor of the electric motor. Power from the compound planetary gear set may then be then be distributed to two output shafts via a carrier and the sun gear of the planetary differential gear set.

In another example, a compound planetary gear set for power transmission and a planetary differential gear set with an input on the carrier and dual sun gear outputs therein may be included within the interior of the rotor of the electric motor. In the planetary differential gear set of this example configuration, input to the planetary differential gear set may come from a sun gear of the compound planetary gear set meshing with planet gears of the planetary gear set, the former which may then transmit power to the planetary differential gear set via a carrier contained therein. Power from the compound planetary gear set may then be then be distributed to two output shafts via two sun gears of the planetary differential gear set.

In yet another example, an open or planetary differential may be included within the interior of the rotor of the electric motor. The differential may transmit power from the rotor via shafts to dual planetary gear sets on either end of the rotor of the electric motor, with each planetary gear set connected to an output shaft. The dual planetary gear sets may be identical, each with an input from the differential on sun gears of the respective planetary gear sets. Within a given planetary gear set, the sun gear may mesh with planet gears, which may be coupled via a ring gear and the ring gear may be anchored to the housing of the electric motor and thus stationary. The planet gears may couple to a carrier of the planetary gear set, which may transmit power to an output shaft.

In all of the three aforementioned examples, coolant and lubrication may be circulated through the interior of the rotor, including the gearbox. This may cool the rotor while cooling and lubricating the components of the gearbox simultaneously.

In this way, by utilizing the interior of the rotor of the electric motor to enclose the gearbox in a plurality of configurations, the gearbox and electric motor may be further integrated, reducing weight and volume requirements. A technical effect of sharing coolant and lubrication systems among the gearbox and electric motor, in all three of the aforementioned configurations, is that a simplified cooling and lubrication system may be attained. Overall, integration of a planetary differential system may reduce packaging space and may increase cost effectiveness.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
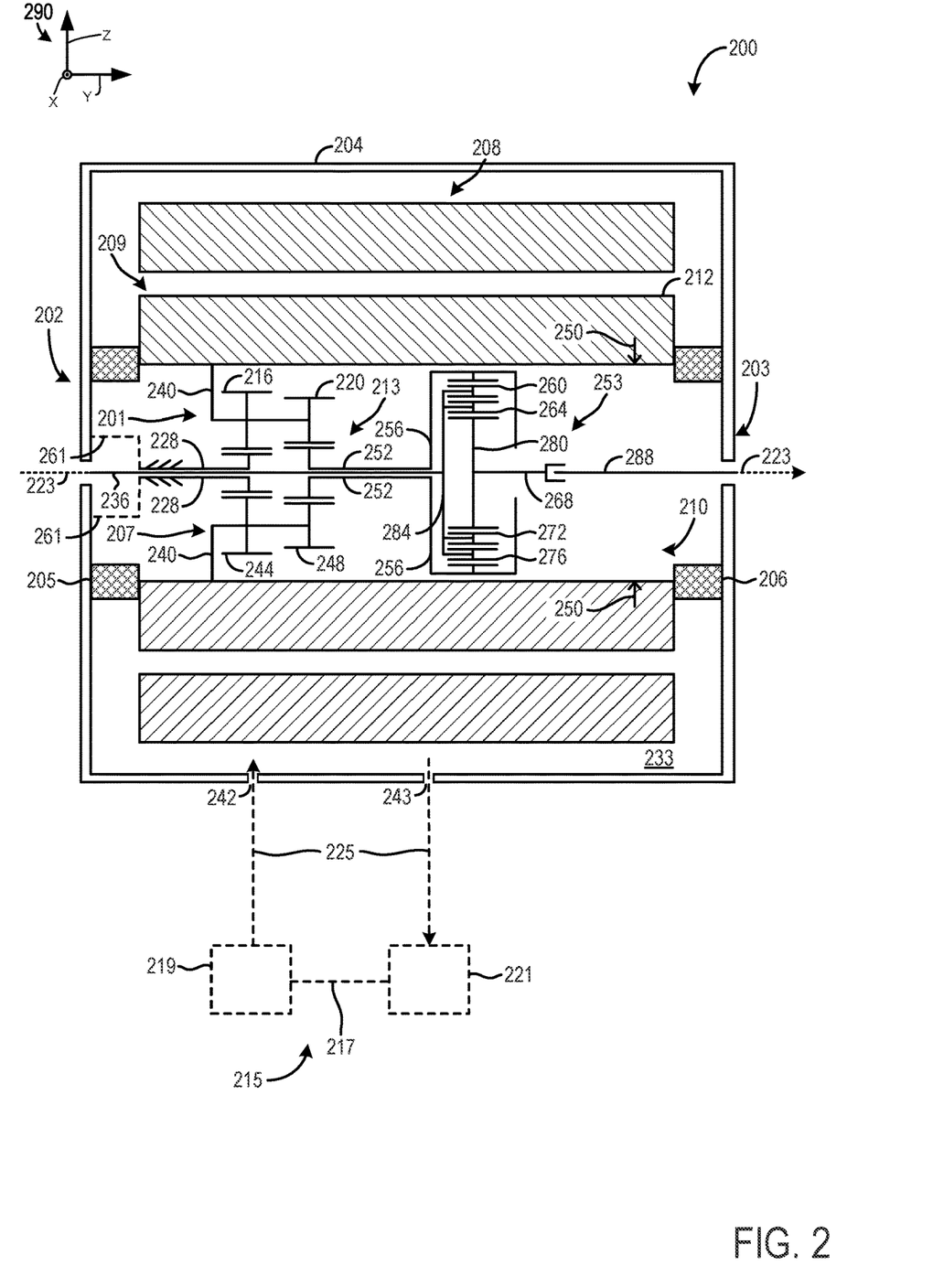
FIG. 2 shows a schematic example of a first configuration of a gearbox integrated into a rotor of the electric motor of a vehicle.
Figure 3:
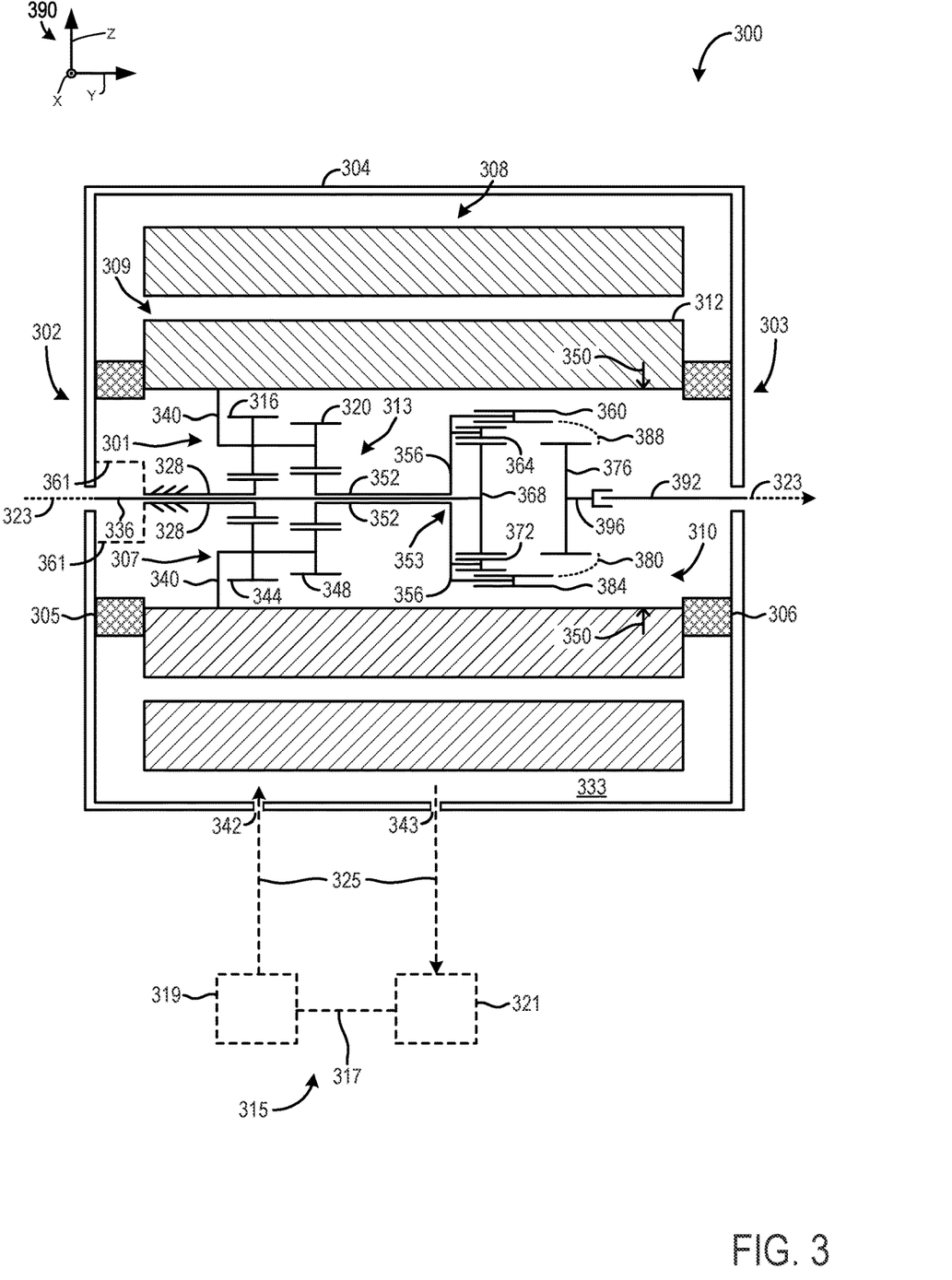
FIG. 3 shows a schematic example of a second configuration of the gearbox integrated into the rotor of the electric motor of a vehicle.
Figure 4:
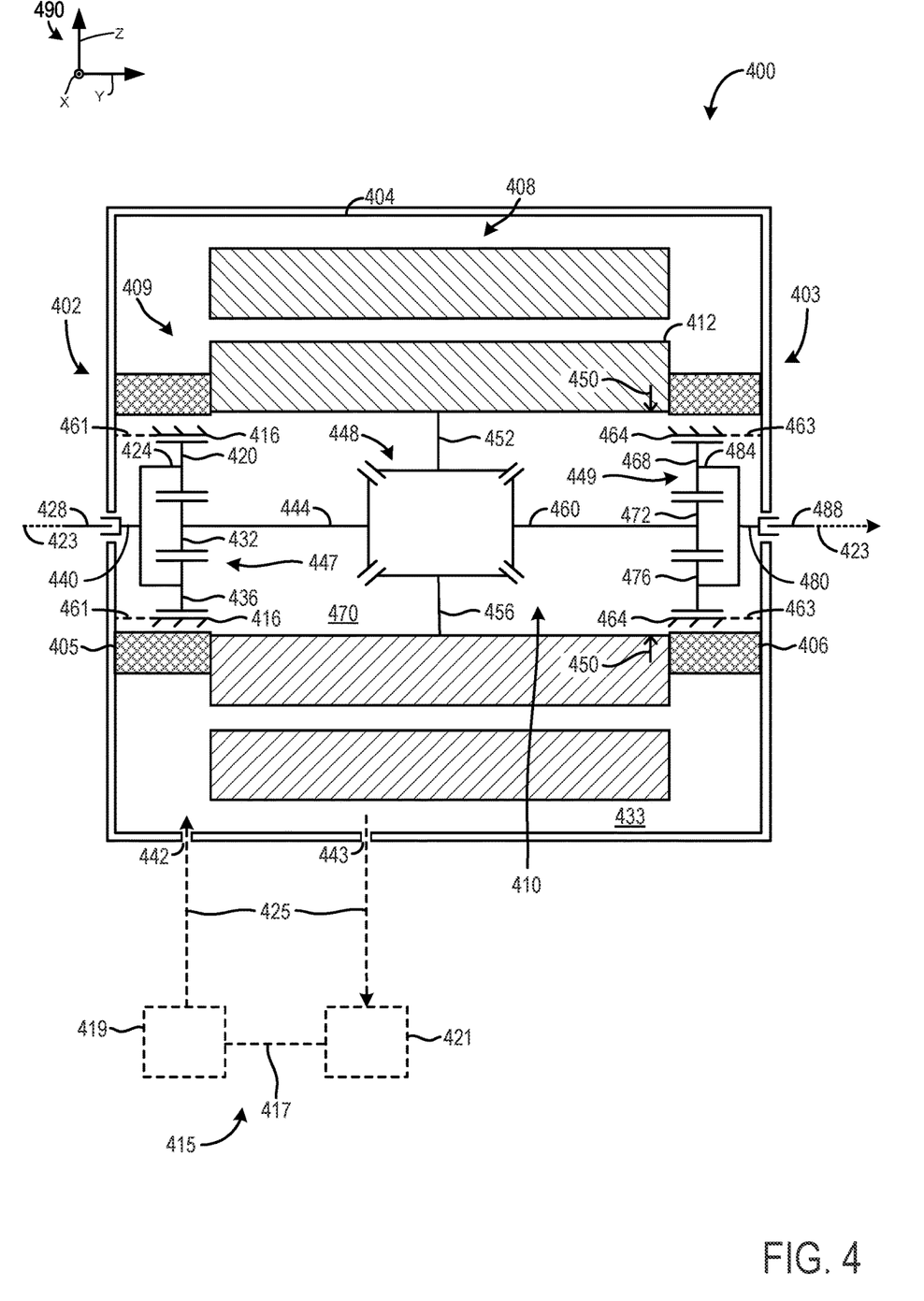
FIG. 4 shows a schematic example of a third configuration of the gearbox integrated into the rotor of the electric motor of a vehicle.

The following description relates to systems for enclosing a gear box within a rotor of an electric motor. Such systems may be integrated within an electric motor of a vehicle, shown schematically in FIG. 1. A gearbox including compound planetary gear sets for power transmission and a differential gear set may be integrated within the electric motor in a plurality of configurations, as shown in FIGS. 2-4. In particular, FIG. 2 illustrates a first configuration for a compound planetary gear set which may transmit power from the rotor of the electric motor to a planetary differential gear set via a ring gear of the planetary differential gear set. FIG. 3 illustrates a second configuration, which utilizes the same compound planetary gear set illustrated in FIG. 2 to transmit power to a spur differential gear set via input to the carrier of the spur differential gear set. FIG. 4 illustrates a third configuration, in which a differential (either planetary or open) gear set may couple to the rotor of the electric motor, and may transmit power to dual planetary gear sets.

Figure 1:
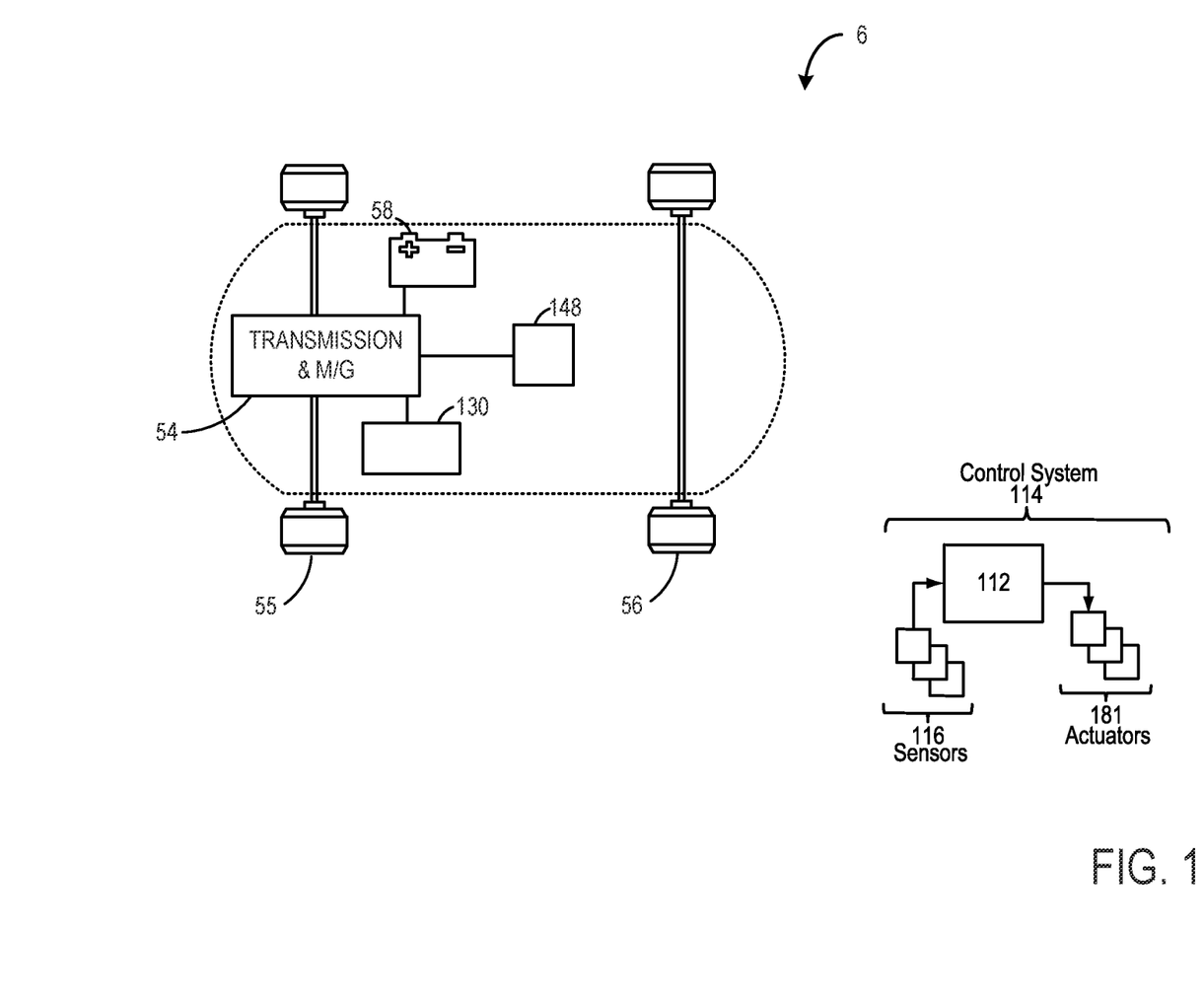
FIG. 1 shows a schematic example of an electric motor in a vehicle.

FIG. 1 shows a schematic depiction of a vehicle system 6 that can derive propulsion power from an electric motor 54. Electric motor 54 receives electrical power from a traction battery 58 to provide torque to rear vehicle wheels 55. Electric motor 54 may also be operated as a generator to provide electrical power to charge traction battery 58, for example, during a braking operation. It should be appreciated that while FIG. 1 depicts an electric motor 54 mounted in a rear wheel drive configuration, other configurations are possible, such as employing electric motor 54 in a front wheel configuration, or in a configuration in which there is an electric motor mounted to both the rear vehicle wheels 55 and front vehicle wheels 56.

Electric motor 54 may include a gearbox integrated therein (to be described further therein). The integrated gearbox may include a differential and a planetary gear set for transmitting power from the electric motor 54 to the rear vehicle wheels 55. A pump system 130 may be coupled to the gearbox of the electric motor 54 to flow lubricating (transmission) oil through the electric motor 54 during operation. Additionally, electric motor 54 may include a cooling system 148, including a coolant pump, and a heat exchanger in fluidic communication with the pump via a conduit. The cooling system 148 may be described more with reference to FIGS. 2-4. Electric motor 54 may also include at least one clutch. Controller 112 may send a signal to an actuator of the clutch to engage or disengage the clutch, so as to couple or decouple power transmission from the electric motor 54 to the rear vehicle wheels 55. Controller 112 may also be electronically coupled to the cooling system 148, e.g. in order to modulate operation of the cooling pump in response to the temperature of the electric motor 54.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, pump system 130, etc. The controller 112 may receive input data from the various sensors, process the input data, and trigger the actuators in response to the processed input data based on instruction or code programmed therein corresponding to one or more routines.

FIG. 2 schematically illustrates a cross-sectional view of a first example configuration of an electric motor 200 of a vehicle system (such as vehicle system 6 of FIG. 1) including a gearbox integrated therein. The electric motor 200 may be similar to the electric motor 54 of FIG. 1. The cross-sectional view may be taken along a radial axis of the electric motor 200, such that the cross-sectional view is in the y-z plane, as indicated by axis system 290, with the radial direction of the electric motor 200 parallel to the z-axis of the axis system 290 and the axial direction of the electric motor 200 parallel to the y-axis of the axis system 290. The electric motor 200 may be one of a variety of suitable electric alternating current (AC) motor configurations. For example, electric motor 200 may be an AC motor, the types of which include asynchronous (e.g., squirrel cage and wound rotor) and synchronous style motors. Synchronous motors such as multiphase, may be used in certain configurations. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

Electric motor 200 may include a housing 204. Housing 204 may serve to enclose and separate the internal components included within the housing 204 from other components within the vehicle system. Housing 204 may further include a first bearing 205 (maintained at first end 202 of the electric motor 200) and a second bearing 206 (maintained at second end 203 of the electric motor 200). The first bearing 205 and the second bearing 206 may be placed in contact with a first output shaft 236 and a second output shaft 288 respectively, permitting the first output shaft 236 and the second output shaft 288 to rotate. The first output shaft 236 and the second output shaft 288 may an axle such as the axle of the rear vehicle wheels 55 of FIG. 1. The housing 204, in conjunction with the first bearing 205 and the second bearing 206, may serve to fluidly seal off the internal components of the electric motor 200, such that the space external to the housing 204 is fluidly decoupled from the electric motor 200. Included within the housing 204 is a stator 208, which may be fixed to the housing 204. Stator 208 may include a plurality of conducting wires (not shown) which may extend throughout the body of the stator, and may generate rotating magnetic fields. Situated concentrically within the stator is a rotor 209. The magnetic fields generated by currents circulating through the plurality of conducting wires within the stator 208 may cause the rotor 209 to rotate. The rotor includes a rotor core 212, which may include metal laminations (e.g., laminated magnetic steel or iron) or a solid magnetic metal. Thus, the rotor core 212 includes a magnetically interactive portion (e.g., permanent magnet or electromagnet). It will be appreciated that during motor operation, the rotor 209 may rotate while the stator 208 is held stationary.

The housing 204 may form a boundary of a cavity 233 surrounding the stator 208 and rotor 209. The cavity 233 within the housing 204 may include a plurality of passages that may be utilized to circulate a working fluid (e.g., oil, coolant (e.g., a mixture of water and glycol), water, and the like) in order to provide cooling of the stator 208 and rotor 209 via a coolant pump 219, to be described further herein. Although FIG. 2 depicts housing 204 and the cavity 233 schematically at high level, it will be understood that the housing 204 and the cavity 233 may have greater structural complexity. For example, the housing 204 may also include a plurality of fins extending inward toward the stator 208 and multiple coolant passages positioned between the fins. The coolant passages between the fins may be coupled in a series and/or parallel flow arrangement.

The stator 208 and the rotor 209 are configured to electrically interact to generate a rotational output and, in some cases, generate electrical energy responsive to receiving a rotational input from an external source such as a vehicle gear-train, in one use-case example. However, as mentioned above, the motor may be used in wide variety of operating environments. As such, the electric motor 200 is configured to generate rotational output and, in some examples, in a regeneration mode, receive rotational input and generate electrical energy output. Thus, the electric motor 200 may be designed to receive electrical energy from an energy storage device (such as traction battery 58 of FIG. 1) and, in some examples, transfer energy to the energy storage device. Wired and/or wireless energy transfer mechanisms may be used to facilitate this energy transfer functionality.

During operation of the electric motor 200, the electric motor may rise in temperature due to, for example, heating losses generated by currents circulating in the rotor 209 and stator 208, air windage losses, etc. As an example, during operation of the electric motor 200, the rotor 209 may heat up to temperatures as high as 200° C. Motor efficiency and performance may be degraded as a result of the excess heating. Hence, electric motor cooling methods and systems may be employed in order to enhance motor performance.

As an example, a cooling system 215 of the electric motor and the enclosed gearbox may include a heat exchanger 221 in fluidic communication with a coolant pump 219 via a first coolant conduit 217. The cooling system 215 may be similar to the cooling system 148 of FIG. 1 and may be used to circulate a working fluid coolant through the plurality of passages within the cavity 233 of the housing 204. The heat exchanger 221 is configured to dissipate heat from the coolant traveling therethrough to the surrounding environment or other suitable medium (e.g., water, oil, glycol, and the like). To accomplish heat transfer, the heat exchanger 221 may include components such as conduits, fins, a housing, etc. The coolant pump 219 is configured to circulate coolant through the plurality of passages in the cavity 233 and may include conventional components such as chambers, pistons, valves, impellers, etc., to enable the circulation. A second coolant conduit 242 and a third coolant conduit 243 are shown extending between the coolant pump 219 and the cavity 233 and the heat exchanger 221 and the cavity 233, respectively. Arrows 225 depict the general direction of coolant flow through the second coolant conduit 242 and the third coolant conduit 243. The second coolant conduit 242 and the third coolant conduit 243 are specifically shown extending through an upper portion of the housing 204. However, numerous suitable coolant conduit arrangements have been envisioned. For instance, the second coolant conduit 242 in fluidic communication with the coolant pump 219 may extend through one axial side (e.g. the first end 202) of the housing 204, and the third coolant conduit 243 in fluidic communication with the heat exchanger 221 may extend through the opposing axial side (e.g. the second end 203) of the housing 204. Further, in another example, the second coolant conduit 242 may extend through a lower side of the housing 204 while the third coolant conduit 243 may extend through an upper side of the housing 204, or vice versa.

Additionally, in the current embodiment, an air gap between the rotor 209 and stator 208 may be maintained free of coolant and/or lubrication oil. For example, the air gap may be maintained free of coolant and/or lubrication by any of a lamination design of the stator 208 which may cover the air gap, the design of the housing 204 (such as in the design of coolant passages/fins of the housing 204) which may fluidly isolate the air gap, baffles which may cover the air gap, and/or screens which may cover the air gap.

The rotor 209 may include an interior envelope 250, which may be a hollow space included within the core 212 of the rotor 209. Included within the interior envelope 250 of the rotor 209 are a compound planetary gear set 213 and a planetary differential gear set 253, which together may make up the gearbox 210 of the electric motor 200. The compound planetary gear set 213 and the planetary differential gear set 253 may be aligned along a central axis 223 of the electric motor 200. The interior envelope 250 may be sealed off from the rest of the interior of the electric motor 200 through bearings 205, 206. The compound planetary gear set 213 may be placed proximal to the first end 202 of the interior envelope 250 of the rotor 209, and may couple to the planetary differential gear set 253, while the planetary differential gear set 253 may be placed proximal to the second end 203 of the interior envelope 250 of the rotor 209, and may couple to the first output shaft 236 and the second output shaft 288. With reference to the y-axis of axis system 290, the position of the compound planetary gear set 213 may be to the left of the planetary differential gear set 253, along the negative y direction of the y-axis.

The compound planetary gear set 213 may transmit power from the rotation of the rotor 209 to the planetary differential gear set 253, and the latter which may distribute power between the first output shaft 236 and the second output shaft 288. In one example, the compound planetary gear set may include a planetary gear set with composite planet gears. Each composite planet gear is a pair of rigidly connected and longitudinally arranged gears of different radii. For each composite planet gear, one of the two gears engages a centrally located sun gear, while the other engages an outer ring gear.

To elaborate further, the compound planetary gear set 213 may include a first sun gear 228, a second sun gear 252, a carrier 240, a first composite planet gear 201, and a second composite planet gear 207. While the example embodiment described here of the compound planetary gear set 213 includes two composite planet gears 201, 207, other embodiments may include a plurality of composite planet gears. The first composite planet gear 201 comprises each of a first planet gear 216 meshing with the first sun gear 228 of the compound planetary gear set 213, and a second planet gear 220 meshing with the second sun gear 252 of the compound planetary gear set 213. The first planet gear 216 and the second planet gear 220 may be longitudinally aligned on one side of the central axis 223, and may be fixed to the rotor 209 via carrier 240. Similarly, the second composite planet gear 207 comprises each of a third planet gear 244 meshing with the first sun gear 228 of the compound planetary gear set 213, and a fourth planet gear 248 meshing with the second sun gear 252 of the compound planetary gear set 213. The third planet gear 244 and the fourth planet gear 248 may be longitudinally aligned on another side of the first output shaft 236 opposite the first planet gear 216 and the second planet gear 220 respectively, and may be fixed to the rotor 209 via carrier 240. The first sun gear 228 is grounded to the housing 204 of the electric motor 200, the housing 204 enclosing the rotor 209 of the electric motor 200. In this way, the electric motor 200 may transmit power from the rotor 209 to each of the first output shaft 236 and the second output shaft 288 included within the interior envelope 250 via the compound planetary gear set 213, the carrier 240, and the planetary differential gear set 253.

The planetary differential gear set 253 may receive power from the compound planetary gear set 213, and may distribute power to the first output shaft 236, and the second output shaft 288. As an example, the planetary differential gear set 253 may distribute power to the first output shaft 236 and the second output shaft 288 in an even manner, e.g., equally. The planetary differential gear set 253 may include a carrier 284, and a plurality of planet gears, depicted here as a first outer planet gear 260, a first inner planet gear 264, a second inner planet gear 272, and a second outer planet gear 276. However, in other embodiments of the electric motor 200, the planetary differential gear set 253 may not be limited to two inner planet gears and two outer planet gears, and may contain more of a plurality of planet gears. Additionally, the planetary differential gear set includes the ring gear 256, and a sun gear 280. The ring gear 256 may be axially aligned with the second sun gear 252 of the compound planetary gear set 213, and may be mechanically coupled to the second sun gear 252 via one or more shafts. As mentioned above, the planetary differential gear set 253 may receive input from the compound planetary gear set 213, e.g., from the second sun gear 252 meshing with a plurality of planet gears, which may then transmit power to the ring gear 256. The ring gear 256 may drive the planetary differential gear set 253 by meshing with a first outer planet gear 260 and a second outer planet gear 276 included therein. The outer planet gears 260, 276 may be placed on opposite sides of the central axis 223 within the ring gear 256. The first outer planet gear 260 may further mesh with the first inner planet gear 264, while the second outer planet gear 276 may further mesh with the second inner planet gear 272. The inner planet gears 264, 272 may be placed on opposite sides of the central axis 223. The inner planet gears 264, 272 may each further mesh with the sun gear 280, which may be connected to the second output shaft 288 via clutch 268. Clutch 268 may be any of a wet plate clutch, a dog clutch or an electromagnetic clutch. Each of the first outer planet gear 260, the second outer planet gear 276, the first inner planet gear 264, and the second inner planet gear 272 may be mechanically coupled to a carrier 284. The carrier 284 may be further mechanically coupled to the first output shaft 236.

The interior envelope 250 of rotor 209, including gearbox 210, may also be utilized for rotor cooling. As an example, during motor operation, the rotor 209 may heat up to temperatures as high as 200° C. In order to counteract such heating during motor operation, coolant oil and/or lubricant may be introduced into the interior envelope 250 of the rotor 209. The coolant oil and/or lubricant introduced into the interior envelope 250 may cool the rotor laminations, in addition to cooling/lubricating the components of the gearbox 210. As one example, lubrication may be included, e.g., stored, in the interior envelope 250 of the rotor 209, which may be fluidly sealed off from the rest of the electric motor 200, serving to continually lubricate the components of the gearbox 210. As another example, coolant and/or lubrication which may circulate through the plurality of passages within the cavity 233 via the coolant pump 219 and the heat exchanger 221 may be further circulated through the interior envelope 250 of the rotor 209, via internal fluid channels 261 which may be included in the first sun gear 228. In this way, the cooling system 215 may additionally be utilized for rotor cooling.

In this way, the electric motor 200 may transmit power from the rotor 209 to the compound planetary gear set 213, which via the second sun gear 252 meshing with the ring gear 256 may provide a power input to the planetary differential gear set 253. Planetary differential gear set 253 may transfer power applied to the ring gear 256 to the second output shaft 288 via sun gear 280 coupled to a clutch 268. Additionally, planetary differential gear set 253 may transfer power applied to the ring gear 256 to the first output shaft 236 via the carrier 284 coupled to each of the first outer planet gear 260, the first inner planet gear 264, the second inner planet gear 272, and the second outer planet gear 276. By positioning the gearbox 210 within the interior envelope 250 of the rotor 209, the electric motor 200 may maintain a high power density and a large gear ratio flexibility within a small spatial volume. Additionally, by arranging the gearbox 210 within the electric motor 200, the gearbox 210 and the electric motor 200 may both be lubricated and cooled by pumping coolant and/or lubricant into the interior envelope 250 of the rotor 209 via cooling system 215.

FIG. 3 schematically illustrates a cross-sectional view of a second example configuration of an electric motor 300 of a vehicle system (such as vehicle system 6 of FIG. 1). The electric motor 300 may be the same as the electric motor 54 of FIG. 1. The cross-sectional view may be taken along a radial cross-section of the electric motor 300, such that the cross-sectional view is in the y-z plane, as indicated by axis system 390, with the radial direction of the electric motor 300 parallel to z-axis of the axis system 390 and the axial direction of the electric motor 300 parallel to the y-axis of the axis system 390. The electric motor 300 may be one of a variety of suitable electric alternating current (AC) motor configurations. For example, electric motor 300 may be an AC motor, the types of which include asynchronous (e.g., squirrel cage and wound rotor) and synchronous style motors. Synchronous motors such as multiphase, may be used in certain configurations. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

Electric motor 300 may include a housing 304. Housing 304 may serve to enclose the internal components included within the housing 304 from other components within the vehicle system. Housing 304 may further include a first bearing 305 (maintained at first end 302 of the electric motor 300) and a second bearing 306 (maintained at second end 303 of the electric motor 300). The first bearing 305 and the second bearing 306 may be placed in contact with a first output shaft 336 and a second output shaft 392 respectively, permitting the first output shaft 336 and the second output shaft 392 to rotate. The first output shaft 336 and the second output shaft 392 may be the same as the axle of the rear vehicle wheels 55 of FIG. 1. The housing 304, in conjunction with the first bearing 305 and the second bearing 306, may serve to fluidly seal off the internal components of the electric motor 300, such that the space external to the housing 304 is fluidly decoupled from the electric motor 300. Included within the housing 304 is a stator 308, which may be fixed to the housing 304. Stator 308 may include a plurality of conducting wires (not shown) which may extend throughout the body of the stator, and may serve to generate rotating magnetic fields. Situated concentrically within the stator is a rotor 309. The magnetic fields generated by current circulating in the plurality of conducting wires within the stator 308 may cause the rotor 309 to rotate. The rotor includes a rotor core 312, which may include metal laminations (e.g., laminated magnetic steel or iron) or a solid magnetic metal. Thus, the rotor core 312 includes a magnetically interactive portion (e.g., permanent magnet or electromagnet). It will be appreciated that during motor operation the rotor 309 may rotate while the stator 308 is held stationary.

The housing 304 may form a boundary of cavity 333 surrounding the stator 308 and rotor 309. The cavity 333 within the housing 304 may include a plurality of passages which may be utilized to circulate a working fluid (e.g., oil, coolant (e.g., a mixture of water and glycol), water, and the like) in order to provide cooling effects for the stator 308 and rotor 309 via a coolant pump 319, to be described further herein. Although FIG. 3 depicts housing 304 and the cavity 333 schematically at high level, it will be understood that the housing 304 and the cavity 333 may have greater structural complexity. For example, the housing 304 may include a plurality of fins extending inward toward the stator 308 and multiple coolant passages positioned between the fins. The coolant passages between the fins may be coupled in a series and/or parallel flow arrangement.

The stator 308 and the rotor 309 are configured to electrically interact to generate a rotational output and, in some cases, generate electrical energy responsive to receiving a rotational input from an external source such as a vehicle gear-train, in one use-case example. However, as mentioned above, the motor may be used in variety of operating environments. As such, the electric motor 300 is configured to generate rotational output and, in some examples, in a regeneration mode, receive rotational input and generate electrical energy output. Thus, the electric motor 300 may be designed to receive electrical energy from the energy storage device (such as traction battery 58 of FIG. 1) and, in some examples, transfer energy to the energy storage device. Wired and/or wireless energy transfer mechanisms may be used to facilitate this energy transfer functionality.

During operation of the electric motor 300, the electric motor may heat due to e.g. heating losses generated by currents circulating in the rotor 309 and stator 308, air windage losses, etc. As an example, during operation of the electric motor 300, the rotor 309 may heat up to temperatures as hot as 200° C. Motor efficiency and performance may be degraded as a result of the excess heating. Hence, electric motor cooling methods and systems may be employed in order to enhance motor performance.

As an example, a heat exchanger 321 in fluidic communication with a coolant pump 319 via a first coolant conduit 317 may comprise a cooling system 315, and may be used to circulate a working fluid coolant through the plurality of passages in the cavity 333 of the housing 304. The cooling system 315 may be the same as the cooling system 148 of FIG. 1. The heat exchanger 321 is designed to flow heat from the coolant traveling therethrough to the surrounding environment or other suitable medium (e.g., water, oil, glycol, and the like). To accomplish the heat transfer functionality the heat exchanger 321 may include components such as conduits, fins, a housing, etc. The coolant pump 319 is designed to circulate coolant through the plurality of passages in the cavity 333 and may include conventional components such as chambers, pistons, valves, impellers, etc., to accomplish the coolant circulation functionality. A second coolant conduit 342 and a third coolant conduit 343 are shown extending between the coolant pump 319 and the cavity 333 and the heat exchanger 321 and the cavity 333, respectively. Arrows 325 depict the general direction of coolant flow through the second coolant conduit 342 and the third coolant conduit 343. The second coolant conduit 342 and the third coolant conduit 343 are specifically shown extending through an upper portion of the housing 304. However, numerous suitable coolant conduit arrangements have been envisioned. For instance, the second coolant conduit 342 in fluidic communication with the coolant pump 319 may extend through one axial side (e.g. the first end 302) of the housing 304 and the third coolant conduit 343 in fluidic communication with the heat exchanger 321 may extend through the opposing axial side (e.g. the second end 303) of the housing 304. Further, in another example, the second coolant conduit 342 may extend through a lower side of the housing 304 while the third coolant conduit 343 may extend through an upper side of the housing 304, or vice versa. Such systems and methods may be taken in conjunction with rotor cooling methods, to be described further herein.

Additionally, in the current embodiment, an air gap between the rotor 309 and stator 308 may be maintained free of coolant and/or lubrication oil. For example, the air gap may be maintained free of coolant and/or lubrication by any of a lamination design of the stator 308 which may cover the air gap, the design of the housing 304 (such as in the design of coolant passages/fins of the housing 304) which may fluidly isolate the air gap, baffles which may cover the air gap, and/or screens which may cover the air gap.

The rotor 309 may include an interior envelope 350, which may be a hollow space included within the core 312 of the rotor 309. Included within the interior envelope 350 of the rotor 309 is a compound planetary gear set 313 and a planetary differential gear set 353, which together may make up the gearbox 310 of the electric motor 300. The compound planetary gear set 313 and the planetary differential gear set 353 may be aligned along a central axis 323. The interior envelope 350 may be sealed off from the rest of the interior of the electric motor 300 through bearings 305, 306. The interior envelope 350 of the electric motor 300 may be wider than an interior envelope 250 of a first configuration of electric motor 200 of FIG. 2, in order to enclose the planetary differential gear set 353, to be described further herein. The design of the compound planetary gear set 313 may be significantly similar to the design of the compound planetary gear set 213 of FIG. 2, with the differences between them described further herein. The compound planetary gear set 313 may be placed proximal to the first end 302 of the interior envelope 350 of the rotor 309, and may couple to the planetary differential gear set 353, while the planetary differential gear set 353 may be proximal to the second end 303 of the interior envelope 350 of the rotor 309, and may couple to a first output shaft 336 and a second output shaft 392. With reference to the y-axis of axis system 390, the position of the compound planetary gear set 313 may be to the left of the planetary differential gear set 353, along the negative y direction of the y-axis.

The compound planetary gear set 313 may serve to transmit power from the rotation of the rotor 309 to the planetary differential gear set 353, the latter which may then distribute power between the first output shaft 336 and the second output shaft 392. A compound planetary gear set represents a planetary gear set with composite planet gears. Each composite planet gear is a pair of rigidly connected and longitudinally arranged gears of different radii. For each composite planet gear, one of the two gears engages a centrally located sun gear, while the other engages an outer ring gear.

In more detail, the compound planetary gear set 313 may include each of a first sun gear 328, a second sun gear 352, a carrier 340, a first composite planet gear 301, and a second composite planet gear 307. While the example embodiment described here of the compound planetary gear set 313 includes two composite planet gears 301, 307, other embodiments may include a plurality of composite planet gears. The first composite planet gear 301 comprises each of a first planet gear 316 meshing with the first sun gear 328 of the compound planetary gear set 313, and a second planet gear 320 meshing with the second sun gear 352 of the compound planetary gear set 313. The first planet gear 316 and the second planet gear 320 may be longitudinally aligned on one side of the central axis 323, and may be fixed to the rotor 309 via carrier 340. Similarly, the second composite planet gear 307 comprises each of a third planet gear 344 meshing with the first sun gear 328 of the compound planetary gear set 313, and a fourth planet gear 348 meshing with the second sun gear 352 of the compound planetary gear set 313. The third planet gear 344 and the fourth planet gear 348 may be longitudinally aligned on another side of the first output shaft 336 opposite the first planet gear 316 and the second planet gear 320 respectively, and may be fixed to the rotor 309 via carrier 340. The first sun gear 328 may be grounded to a housing 304 of the electric motor 300, the housing 304 enclosing the rotor 309 of the electric motor 300. In this way, the electric motor 300 may transmit power from the rotor 309 to each of a first output shaft 336 and a second output shaft 392 included within the interior envelope 350 via the compound planetary gear set 313, the carrier 340, and then the planetary differential gear set 353.

The planetary differential gear set 353 may receive power from the compound planetary gear set 313, and may distribute power to the first output shaft 336, and the second output shaft 392. As an example, the planetary differential gear set 353 may distribute power to the first output shaft 336 and the second output shaft 392 in an even manner. The planetary differential gear set 353 may be what is referred to in the art as a spur gear differential, in which the planetary differential gear set 353 may not include a ring gear, and in which the carrier 356 may serve to fully encase the planetary differential gear set 353. The planetary differential gear set 353 includes a carrier 356, a first outer planet gear 360, a first inner planet gear 364, a second inner planet gear 372, and a second outer planet gear 384. Additionally, the planetary differential gear set 353 includes a first sun gear 376 and a second sun gear 368.

In planetary differential gear set 353, the carrier 356 is mechanically coupled to each of the first outer planet gear 360, the first inner planet gear 364, the second inner planet gear 372, and the second outer planet gear 384, with each of the first outer planet gear 360, first inner planet gear 364, second inner planet gear 372, and second outer planet gear 384 co-rotating with the carrier 356 about the central axis 323. The carrier 356 may be axially aligned with the second sun gear 352 of the compound planetary gear set 313, and may be mechanically coupled to the second sun gear 352 via one or more shafts. The carrier 356 may then receive input, e.g. from a plurality of planet gears of the compound planetary gear set 313 meshing with the second sun gear 352, which may then transmit power the carrier 356. Within the carrier 356, the first outer planet gear 360 may mesh with each of the first inner planet gear 364 and the first sun gear 376, the latter meshing indicated by dotted line 388. The first inner planet gear 364 may additionally mesh with the second sun gear 368. Similarly, the second outer planet gear 384 may mesh with each of the second inner planet gear 372 and the first sun gear 376, the meshing indicated by dotted line 380. The second inner planet gear may additionally mesh with the second sun gear 368. Hence, the outer planet gears 360, 384 may each mesh with the first sun gear 376, as shown by dotted lines 388 and 380, respectively, while the inner planet gears 364, 372 may each mesh with the second sun gear 368.

The interior envelope 350 of rotor 309 including gearbox 310 may also be utilized for rotor cooling. As an example, during motor operation, the rotor 309 may heat up to temperatures as hot as 200° C. In order to counteract such heating during motor operation, coolant oil and/or lubricant may be introduced into the interior envelope 350 of the rotor 309. The coolant oil and/or lubricant introduced into the interior envelope 350 may then serve to cool the rotor laminations, in addition to cooling/lubricating the components comprising the gearbox 310. As one example, lubrication may be included in the interior envelope 350 of the rotor 309, which may be fluidly sealed off from the rest of the electric motor 300, serving to continually lubricate the components of the gearbox 310. As another example, coolant and/or lubrication which may circulate within the plurality of passages in the cavity 333 via the coolant pump 319 and the heat exchanger 321 may be further circulated through the interior envelope 350 of the rotor 309, via internal fluid channels 361 which may be included in the first sun gear 328. In this way, the cooling system 315 may additionally be utilized in rotor cooling.

In this way, the electric motor 300 may transmit power from the rotor 309 to the compound planetary gear set 313, which via the second sun gear 352 meshing with the carrier 356 may provide a power input to the planetary differential gear set 353. Planetary differential gear set 353 may then transfer power applied to the carrier 356 to the second output shaft 392 via the first sun gear 376 coupled to a clutch 396, and may transfer power applied to the carrier 356 to the first output shaft 336 via the second sun gear 368. By maintaining the gearbox 310 within the interior envelope 350 of the rotor 309, the electric motor 300 may maintain a high power density and a large gear ratio flexibility within a small spatial volume. In contrast with planetary differential gear set 253 of FIG. 2, planetary differential gear set 353 may not require a ring gear. Additionally, by maintaining the gearbox 310 within the electric motor 300, the gearbox 310 and the electric motor 300 may share lubricant and cooling by pumping coolant and/or lubrication into the interior envelope 350 of the rotor 309 via cooling system 315.

FIG. 4 schematically illustrates a cross-sectional view of a third example configuration of an electric motor 400 of a vehicle system (such as vehicle system 6 of FIG. 1). The electric motor 400 may be the same as the electric motor 54 of FIG. 1. The cross-sectional view may be taken along a radial cross-section of the electric motor 400, such that the cross-sectional view is in the y-z plane, as indicated by axis system 490, with the radial direction of the electric motor 400 parallel to z-axis of the axis system 490 and the axial direction of the electric motor 400 parallel to the y-axis of the axis system 490. The electric motor 400 may be one of a variety of suitable electric alternating current (AC) motor configurations. For example, electric motor 400 may be an AC motor, the types of which include asynchronous (e.g., squirrel cage and wound rotor) and synchronous style motors. Synchronous motors such as multiphase, may be used in certain configurations. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

Electric motor 400 may include a housing 404. Housing 404 may serve to enclose the internal components included within the housing 404 from other components within the vehicle system. Housing 404 may further include a first bearing 405 (maintained at first end 402 of the electric motor 400) and a second bearing 406 (maintained at second end 403 of the electric motor 400). The first bearing 405 and the second bearing 406 may be placed in contact with a first output shaft 428 and a second output shaft 488 respectively, permitting the first output shaft 428 and the second output shaft 488 to rotate. The housing 404, in conjunction with the first bearing 405 and the second bearing 406, may serve to fluidly seal off an enclosure 470 of the electric motor 400.

The enclosure 470 comprises the interior envelope 450 of the rotor 409 and components contained therein, in addition to space beyond to the first end 402 of the rotor core 412 and enclosed by the first bearing 405, containing the first planetary gear set 447 (to be described further herein), and space beyond to the second end 403 of the rotor core 412 and enclosed by the second bearing 406, containing the second planetary gear set 449 (to be described further herein). Included within the housing 404 is a stator 408, which may be fixed to the housing 404. Stator 408 may include a plurality of conducting wires (not shown) which may extend throughout the body of the stator, and may serve to generate rotating magnetic fields. Situated concentrically within the stator is a rotor 409. The magnetic fields generated by current circulating in the plurality of conducting wires within the stator 408 cause the rotor 409 to rotate. The rotor includes a rotor core 412, which may include metal laminations (e.g., laminated magnetic steel or iron) or a solid magnetic metal. Thus, the rotor core 412 includes a magnetically interactive portion (e.g., permanent magnet or electromagnet). It will be appreciated that during motor operation the rotor 409 may rotate while the stator 408 is held stationary.

The housing 404 may form a boundary of a cavity 433 surrounding the stator 408 and rotor 409. The cavity 433 within the housing 404 may include may include a plurality of passages which may be utilized to circulate a working fluid (e.g., oil, coolant (e.g., a mixture of water and glycol), water, and the like) in order to provide cooling effects for the stator 408 and rotor 409 via a coolant pump 419, to be described further herein. Although FIG. 4 depicts housing 404 and the cavity 433 schematically at high level, it will be understood that the housing 404 and the cavity 433 may have greater structural complexity. For example, the housing 404 may include a plurality of fins extending inward toward the stator 408 and multiple coolant passages positioned between the fins. The coolant passages between the fins may be coupled in a series and/or parallel flow arrangement.

The stator 408 and the rotor 409 are configured to electrically interact to generate a rotational output and, in some cases, generate electrical energy responsive to receiving a rotational input from an external source such as a vehicle gear-train, in one use-case example. However, as mentioned above, the motor may be used in variety of operating environments. As such, the electric motor 400 is configured to generate rotational output and, in some examples, in a regeneration mode, receive rotational input and generate electrical energy output. Thus, the electric motor 400 may be designed to receive electrical energy from the energy storage device (such as traction battery 58 of FIG. 1) and, in some examples, transfer energy to the energy storage device. Wired and/or wireless energy transfer mechanisms may be used to facilitate this energy transfer functionality.

During operation of the electric motor 400, the electric motor may heat due to e.g. heating losses generated by currents circulating in the rotor 409 and stator 408, air windage losses, etc. As an example, during operation of the electric motor 400, the rotor 409 may heat up to temperatures as hot as 200° C. Motor efficiency and performance may be degraded as a result of the excess heating. Hence, electric motor cooling methods and systems may be employed in order to enhance motor performance.

As an example, a heat exchanger 421 in fluidic communication with a coolant pump 419 via a first coolant conduit 417 may comprise a cooling system 415, and may be used to circulate a working fluid coolant through the plurality of passages in the cavity 433 of the housing 404. The cooling system 415 may be the same as the cooling system 148 of FIG. 1. The heat exchanger 421 is designed to flow heat from the coolant traveling therethrough to the surrounding environment or other suitable medium (e.g., water, oil, glycol, and the like). To accomplish the heat transfer functionality the heat exchanger 421 may include components such as conduits, fins, a housing, etc. The coolant pump 419 is designed to circulate coolant through the plurality of passages in the cavity 433 and may include conventional components such as chambers, pistons, valves, impellers, etc., to accomplish the coolant circulation functionality. A second coolant conduit 442 is shown extending between the coolant pump 419 and the cavity 433 and a third coolant conduit 443 is shown extending between the heat exchanger 421 and the cavity 433. Arrows 425 depict the general direction of coolant flow through second coolant conduit 442 and the third coolant conduit 443. The second coolant conduit 442 and the third coolant conduit 443 are specifically shown extending through an upper portion of the housing 404. However, numerous suitable coolant conduit arrangements have been envisioned. For instance, the second coolant conduit 442 in fluidic communication with the coolant pump 419 may extend through one axial side (e.g. the first end 402) of the housing 404 and the third coolant conduit 443 in fluidic communication with the heat exchanger 421 may extend through the opposing axial side (e.g. the second end 403) of the housing 404. Further, in another example, the second coolant conduit 442 may extend through a lower side of the housing 404, while the third coolant conduit 443 may extend through an upper side of the housing 404, or vice versa. Such systems and methods may be taken in conjunction with rotor cooling methods, to be described further herein.

Additionally, in the current embodiment, an air gap between the rotor 409 and stator 208 may be maintained free of coolant and/or lubrication oil. For example, the air gap may be maintained free of coolant and/or lubrication by any of a lamination design of the stator 409 which may cover the air gap, the design of the housing 404 (such as in the design of coolant passages/fins of the housing 404) which may fluidly isolate the air gap, baffles which may cover the air gap, and/or screens which may cover the air gap.

Included within the interior envelope 450 of the rotor 409 is a differential gear set 448. The differential gear set 448 may couple to each of the first planetary gear set 447, and a second planetary gear set 449, which together may make up the gearbox 410 of the electric motor 400. The first planetary gear set 447 may be placed proximal to the first end 402 of the electric motor and external to the interior envelope 450 of rotor 409, while the second planetary gear set 449 may be placed proximal to the second end 403 of the electric motor 400, and external to the interior envelope 450 of rotor 409. In the example configuration depicted in FIG. 4, each of the first planetary gear set 447 and the second planetary gear set 449 may be enclosed within the housing 404 of the electric motor 400. However, in an alternative example, the first planetary gear set 447 may be included in a hubcap of a first wheel (e.g. the first rear wheel of the rear vehicle wheels 55 of FIG. 1), and the second planetary gear set 449 may be included in a hubcap of a second wheel (e.g. the second rear wheel of the rear vehicle wheels 55 of FIG. 1). The latter example may serve to reduce the volume requirements of the housing 404 of the electric motor 400. The differential gear set 448 may be placed equidistant between planetary gear sets 447, 449. The first planetary gear set 447 may be coupled to the differential gear set 448 by a first shaft 444, while the second planetary gear set 449 may be coupled to the differential gear set 448 by second shaft 460.

The differential gear set 448 may be mechanically coupled to the rotor core 412 via upper shaft 452 and lower shaft 456, and hence the shafts 452, 456 may co-rotate with the rotor core 412 about a central axis 423, driving power through the differential gear set 448. The differential gear set 448 may be a planetary gear set or may be an open gear set. The differential gear set may then drive the first planetary gear set 447 and the second planetary gear set 449 via shafts 444, 460, respectively. As an example, if the differential gear set 448 is an open differential, it may distribute torque to the first shaft 444 and the second shaft 460 in an even manner. The first planetary gear set 447 may be placed proximal to the first end 402 of the electric motor 400, whereas the second planetary gear set 449 may be placed proximal to the second end 403 of the electric motor 400. With reference to the y-axis of axis system 490, the position of the first planetary gear set 447 along the y-axis may be proximal to the origin of axis system 490, whereas the position of the second planetary gear set 449 along the y-axis may extend farther in the positive direction along the y-axis.

The first planetary gear set 447 may include a first sun gear 432, which is mechanically coupled to and driven by the differential gear set 448 via first shaft 444. The first sun gear 432 may then mesh with a plurality of planet gears, depicted here as each of a first upper planet gear 420 and a first lower planet gear 436. However, in other embodiments of the electric motor 400, the first planetary gear set 447 may not be limited to a first upper planet gear 420 and a first lower planet gear 436, and may contain more of a plurality of planet gears. The first upper planet gear 420 and the first lower planet gear 436 placed opposite each other, on either side of the first sun gear 432 within the interior envelope 450 of the rotor 409. The first upper planet gear 420 may then mesh with first ring gear 416, which may be mechanically grounded to the housing 404 of the electric motor 400. Similarly, the first lower planet gear 436 may also mesh with first ring gear 416. The planet gears 420, 436 may then drive the first carrier 424 to rotate about the central axis 423, which may couple to the first output shaft 428 through a first disconnect 440.

Similarly, the second planetary gear set 449 may include a second sun gear 472, which is mechanically coupled to and driven by the differential gear set 448 via second shaft 460. The second sun gear 472 may then mesh with a plurality of planet gears, depicted here as each of a second upper planet gear 468 and a second lower planet gear 476. However, in other embodiments of the electric motor 400, the second planetary gear set 449 may not be limited to a second upper planet gear 468 and a second lower planet gear 476, and may include additional gears. The second upper planet gear 468 and the second lower planet gear 476 may be placed oppositely of each other, on either side of the second sun gear 472 within the interior envelope 450 of the rotor 409. The second upper planet gear 468 may then mesh with a second ring gear 464, which may be mechanically grounded to the housing 404 of the electric motor 400. Similarly, the second lower planet gear 476 may also mesh with the second ring gear 464. The planet gears 468, 476 may then drive the second carrier 484 to rotate about the central axis 423, which may couple to the second output shaft 488 through a second disconnect 480.

The interior envelope 450 of the rotor 409 may also be utilized for rotor cooling. As an example, during motor operation, the rotor 409 may heat up to temperatures as hot as 200° C. In order to counteract such heating during motor operation, coolant oil and/or lubricant may be introduced into the interior envelope 450 of the rotor 409. The coolant oil and/or lubricant introduced into the interior envelope 450 may then serve to cool the rotor laminations, in addition to cooling/lubricating the differential gear set 448. As one example, lubrication may be included in the interior envelope 450 of the rotor 409, which may be fluidly sealed off from the rest of the electric motor 400, serving to continually lubricate the differential gear set 448. Additionally, in the example configuration of electric motor 400 depicted in FIG. 4, the first planetary gear set 447 and the second planetary gear set 449 may already receive cooling and lubrication from coolant circulating through the plurality of passages in the cavity 433 via the coolant pump 419 and heat exchanger 421 of cooling system 415.

The electric motor 400 may transmit power from the rotor 409 to the differential gear set 448, which may further transfer power to first planetary gear set 447 via first shaft 444, and to second planetary gear set 449 via second shaft 460. The first planetary gear set 447 may then transfer power to the first output shaft 428 via a first carrier 424, and the second planetary gear set 449 transfer power to the second output shaft 488 via second carrier 484. In contrast to the electric motor 200 in FIG. 2 and the electric motor 300 in FIG. 3, electric motor 400 may be longer in the axial direction, in order for all of the internal components of gearbox 410 to fit within the housing 404 of electric motor 400. Additionally, in comparison to electric motor 200 of FIG. 2 and electric motor 300 of FIG. 3, electric motor 400 may allow for more design flexibility, including in design variations in the gear sets enclosed. By maintaining the gearbox 410 within the electric motor 400, the electric motor 400 may maintain a high power density and a large gear ratio flexibility within a small spatial volume. Additionally, by maintaining the gearbox 410 within the electric motor 400, the gearbox 410 and the electric motor 400 may share lubricant and cooling by pumping coolant and/or lubrication into the interior envelope 450 of the rotor 409 via cooling system 415.

FIG. 4 illustrates a system for the electric motor 400, comprising the first planetary gear set 447 housed within the enclosure 470 of the rotor 409, the second planetary gear set 449 housed within the enclosure 470 of the rotor 409, and the differential gear set 448 housed within the enclosure 470 of the rotor 409, the first planetary gear set 447 positioned on the first end 402 of the differential gear set 448 along a central axis 423 and the second planetary gear set 449 positioned on the second end 403 of the differential gear set 448 along the central axis 423. The first planetary gear set 447 may be mechanically coupled to the differential gear set 448 via the first shaft 444 aligned along the central axis 423, and the second planetary gear set 449 may be mechanically coupled to the differential gear set 448 via the second shaft 460 aligned along the central axis. Additionally, the differential gear set 448 may be coupled to the rotor 409 via each of the upper shaft 452 and the lower shaft 456. The first planetary gear set 447 may include the first sun gear 432 meshing with each of the first upper planet gear 420 and the first lower planet gear 436 coupled to the first output shaft 428. Similarly, the second planetary gear set 449 includes the second sun gear 472 meshing with each of the second upper planet gear 468 and the second lower planet gear 476 coupled to the second output shaft 488. Additionally, the electric motor 200 may contain the cooling system 415 coupled to the enclosure 470 of the rotor 409, the cooling system 415 including the cavity 433 coupling the heat exchanger 421 and the coolant pump 419 to each of the differential gear set 448, the first planetary gear set 447, and the second planetary gear set 449. For example, coolant and/or lubrication which may circulate within the plurality of passages in the cavity 433 via the coolant pump 419 and the heat exchanger 421 may be further circulated through the enclosure 470 of rotor 409, via internal fluid channels 461, 463 within the walls of housing 404, which may be included in the ring gears 416, 464, respectively. In this way, the cooling system 415 may additionally be utilized in rotor cooling.

In this way, by integrating a differential and planetary gear set(s) into an interior envelope of a rotor of an electric motor, a weight and a footprint of a drive unit may be reduced. Each of the three example configurations described above may offer distinct advantages. For example, in the first and second configurations of FIGS. 2 and 3, the integrated gearbox provide an increased allowable range of gear ratios, relative to a conventional gearbox arrangement, as well as a compact geometry, as the entire gearbox may be included within the interior envelope of the rotor. The first configuration may include a longer interior envelope of the rotor in the radial direction compared to the second configuration, while the second configuration may include a longer interior envelope of the rotor in the axial direction than the first configuration. As another example, the third configuration of the electric motor may allow for more design flexibility in the enclosed gear sets than the first and second configurations of the electric motor. Additionally, in all three configurations of the electric motor, coolant and lubrication may be shared between the gearbox and electric motor components, providing simplified cooling and lubrication mechanisms as compared to a conventional electric motor/gearbox system.

The disclosure provides support for a system for an electric motor, comprising: one or more of a planetary gear set and a differential integrated within an envelope of a rotor of the electric motor. In a first example of the system, the one or more of a planetary gear set is coupled to a core of the rotor to transmit power from the rotor to the differential via a coupling between the planetary gear set and the differential. In a second example of the system, optionally including the first example, the system further comprises: a first output shaft projecting axially from the envelope at a first end of the electric motor, a second output shaft projecting from the envelope at a second end of the electric motor, wherein each of the first output shaft and the second output shaft are coupled to the differential and receives power from the electric motor transmitted via the differential. In a third example of the system, optionally including one or both of the first and second examples, the planetary gear set includes each of a first planet gear and a third planet gear placed on either side of the first output shaft, and each of a second planet gear and a fourth planet gear placed on either side of the first output shaft, the second planet gear and the fourth planet gear positioned linearly along a central axis of the envelope relative to the first planet gear and the third planet gear. In a fourth example of the system, optionally including one or more or each of the first through third examples, the first planet gear meshes with a first sun gear mechanically coupled to a housing of the electric motor, and wherein the first planet gear is coupled to the core of the rotor, and wherein the third planet gear meshes with the first sun gear, and wherein the third planet gear is coupled to the core of the rotor, each of the first planet gear and the third planet gear rotatable with the rotor. In a fifth example of the system, optionally including one or more or each of the first through fourth examples, the second planet gear is mechanically coupled to the first planet gear and wherein the fourth planet gear is mechanically coupled to the third planet gear, each of the third planet gear and the fourth planet gear rotatable with the rotor. In a sixth example of the system, optionally including one or more or each of the first through fifth examples, each of the second planet gear and the fourth planet gear mesh with a second sun gear, the second sun gear coupling the planetary gear set to the differential. In a seventh example of the system, optionally including one or more or each of the first through sixth examples, the differential includes each of a first outer planet gear, a first inner planet gear, a second outer planet gear, and a second inner planet gear, wherein the first inner planet gear and the second inner planet gear meshes with an inner sun gear coupled to the second output shaft via a clutch. In an eighth example of the system, optionally including one or more or each of the first through seventh examples, the system further comprises: a cooling system coupled to the housing of the electric motor circulating coolant through one or more fluidic channels coupled to the rotor, the planetary gear set, and the differential.

The disclosure also provides support for a system for an electric motor, comprising: each of a compound planetary gear set and a planetary differential gear set positioned within an envelope of a rotor of the electric motor, the compound planetary gear set and the planetary differential gear set aligned along a central axis of the envelope. In a first example of the system, the compound planetary gear set comprises each of a first sun gear, a second sun gear, a carrier, a first composite planet gear, and a second composite planet gear. In a second example of the system, optionally including the first example, the first sun gear is grounded to a housing of the electric motor, the housing enclosing the rotor of the electric motor. In a third example of the system, optionally including one or both of the first and second examples, the first composite planet gear comprises each of a first planet gear meshing with the first sun gear of the compound planetary gear set, a second planet gear meshing with the second sun gear of the compound planetary gear set, and wherein the second composite planet gear comprises each of a third planet gear meshing with the first sun gear of the compound planetary gear set, and a fourth planet gear meshing with the second sun gear of the compound planetary gear set. In a fourth example of the system, optionally including one or more or each of the first through third examples, the planetary differential gear set includes each of a carrier, a first outer planet gear, a first inner planet gear, a second inner planet gear, and a second outer planet gear, and wherein the first outer planet gear meshes with each of the first inner planet gear and a first sun gear, and wherein the second outer planet gear meshes with each of the second inner planet gear and the first sun gear. In a fifth example of the system, optionally including one or more or each of the first through fourth examples, the electric motor transmits power from the rotor to each of a first output shaft and a second output shaft included within the envelope via the compound planetary gear set, the carrier, and then the planetary differential gear set. In a sixth example of the system, optionally including one or more or each of the first through fifth examples, the system further comprises: circulating coolant and/or lubrication through the envelope of the rotor via fluid channels included in the first sun gear of the compound planetary gear set, the fluid channels fluidly coupling the envelope of the rotor and the housing of the electric motor.

The disclosure also provides support for a system for an electric motor, comprising: a first planetary gear set housed within an enclosure of a rotor, a second planetary gear set housed within the enclosure of the rotor, and a differential gear set housed within the enclosure of the rotor, the first planetary gear set positioned on a side of the differential gear set along a central axis and the second planetary gear set positioned on another side of the differential gear set along the central axis. In a first example of the system, the first planetary gear set is mechanically coupled to the differential gear set via a first shaft aligned along the central axis, wherein the second planetary gear set is mechanically coupled to the differential gear set via a second shaft aligned along the central axis, and wherein the differential gear set is coupled to the rotor via each of an upper shaft and a lower shaft. In a second example of the system, optionally including the first example, the first planetary gear set includes a first sun gear meshing with each of an first upper planet gear and a first lower planet gear coupled to a first output shaft, and wherein the second planetary gear set includes a second sun gear meshing with each of an second upper planet gear and a second lower planet gear coupled to a second output shaft. In a third example of the system, optionally including one or both of the first and second examples, the system further comprises: a cooling system coupled to the enclosure of the rotor, the cooling system including a plurality of passages coupling a heat exchanger and a pump to each of the differential gear set, the first planetary gear set, and the second planetary gear set.

It will be appreciated that the configurations herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an electric motor, comprising:
one or more of a planetary gear set and a differential integrated within an envelope of a rotor of the electric motor wherein the planetary gear set includes a first planet gear meshing with a first sun gear mechanically coupled to a housing of the electric motor, and wherein the first planet gear is coupled to a core of the rotor.

2. The system of claim 1, wherein the one or more of the planetary gear set is coupled to the core of the rotor to transmit power from the rotor to the differential via a coupling between the planetary gear set and the differential.

3. The system of claim 2, further comprising, a first output shaft projecting axially from the envelope at a first end of the electric motor, a second output shaft projecting from the envelope at a second end of the electric motor, wherein each of the first output shaft and the second output shaft are coupled to the differential and receives power from the electric motor transmitted via the differential.

4. The system of claim 3, wherein the planetary gear set includes each of the first planet gear and a third planet gear placed on either side of the first output shaft, and each of a second planet gear and a fourth planet gear placed on either side of the first output shaft, the second planet gear and the fourth planet gear positioned linearly along a central axis of the envelope relative to the first planet gear and the third planet gear.

5. The system of claim 4, wherein the third planet gear meshes with the first sun gear, and wherein the third planet gear is coupled to the core of the rotor, each of the first planet gear and the third planet gear rotatable with the rotor.

6. The system of claim 5, wherein the second planet gear is mechanically coupled to the first planet gear and wherein the fourth planet gear is mechanically coupled to the third planet gear, each of the third planet gear and the fourth planet gear rotatable with the rotor.

7. The system of claim 5, wherein each of the second planet gear and the fourth planet gear mesh with a second sun gear, the second sun gear coupling the planetary gear set to the differential.

8. The system of claim 5, wherein the differential includes each of a first outer planet gear, a first inner planet gear, a second outer planet gear, and a second inner planet gear, wherein the first inner planet gear and the second inner planet gear each mesh with an inner sun gear coupled to the second output shaft via a clutch.

9. The system of claim 5, further comprising a cooling system coupled to the housing of the electric motor circulating coolant through one or more fluidic channels coupled to the rotor, the planetary gear set, and the differential.

10. A system for an electric motor, comprising:
each of a compound planetary gear set and a planetary differential gear set positioned within an envelope of a rotor of the electric motor, the compound planetary gear set and the planetary differential gear set aligned along a central axis of the envelope, wherein the compound planetary gear set comprises a first sun gear grounded to a housing of the electric motor, the housing enclosing the rotor of the electric motor.

11. The system of claim 10, wherein the compound planetary gear set comprises each of the first sun gear, a second sun gear, a carrier, a first composite planet gear, and a second composite planet gear.

12. The system of claim 11, wherein the first composite planet gear comprises each of a first planet gear meshing with the first sun gear of the compound planetary gear set, a second planet gear meshing with the second sun gear of the compound planetary gear set, and wherein the second composite planet gear comprises each of a third planet gear meshing with the first sun gear of the compound planetary gear set, and a fourth planet gear meshing with the second sun gear of the compound planetary gear set.

13. The system of claim 11, wherein the electric motor transmits power from the rotor to each of a first output shaft and a second output shaft included within the envelope via the compound planetary gear set, the carrier, and then the planetary differential gear set.

14. The system of claim 11, further comprising, circulating coolant and/or lubrication through the envelope of the rotor via fluid channels included in the first sun gear of the compound planetary gear set, the fluid channels fluidly coupling the envelope of the rotor and the housing of the electric motor.

15. The system of claim 10, wherein the planetary differential gear set includes each of a carrier, a first outer planet gear, a first inner planet gear, a second inner planet gear, and a second outer planet gear, and wherein the first outer planet gear meshes with each of the first inner planet gear and the first sun gear, and wherein the second outer planet gear meshes with each of the second inner planet gear and the first sun gear.

16. A system for an electric motor, comprising:
a first planetary gear set housed within an enclosure of a rotor;
a second planetary gear set housed within the enclosure of the rotor; and
a differential gear set housed within the enclosure of the rotor, the first planetary gear set positioned on a side of the differential gear set along a central axis and the second planetary gear set positioned on another side of the differential gear set along the central axis; and
a cooling system coupled to the enclosure of the rotor, the cooling system including a plurality of passages coupling a heat exchanger and a pump to each of the differential gear set, the first planetary gear set, and the second planetary gear set.

17. The system of claim 16, wherein the first planetary gear set is mechanically coupled to the differential gear set via a first shaft aligned along the central axis, wherein the second planetary gear set is mechanically coupled to the differential gear set via a second shaft aligned along the central axis, and wherein the differential gear set is coupled to the rotor via each of an upper shaft and a lower shaft.

18. The system of claim 17, wherein the first planetary gear set includes a first sun gear meshing with each of a first upper planet gear and a first lower planet gear coupled to a first output shaft, and wherein the second planetary gear set includes a second sun gear meshing with each of a second upper planet gear and a second lower planet gear coupled to a second output shaft.

\* \* \* \* \*